United States Patent Office 3,014,822
Patented Dec. 26, 1961

3,014,822
PRINTING ON ALUMINUM SURFACES
Vincent A. Lauderman, Hamilton, Ohio, assignor to The Champion Papers Inc., a corporation of Ohio
No Drawing. Filed May 2, 1960, Ser. No. 25,908
5 Claims. (Cl. 148—6.10)

This invention relates to a method of printing directly upon aluminum surfaces by employing ink compositions containing phosphoric acid.

An object of this invention is to provide a simple one-step method of printing on aluminum surfaces which results in good adhesion of the ink coating without the necessity of employing a preliminary treatment of the aluminum surface.

Another object of this invention is to produce ink compositions containing phosphoric acid which have improved adhesion to aluminum surfaces.

Another object of this invention is to produce aluminum surfaces printed with strongly adherent ink compositions containing phosphoric acid.

Heretofore methods of printing upon aluminum surfaces, such as aluminum foil or aluminum foil laminated to paper or plastics, have met with considerable difficulty in obtaining strong adherence of the ink to the foil. In order to overcome the problem of adherence it has previously been suggested to employ a preliminary treatment of the aluminum surface with an organic solvent solution of phosphoric acid followed by a separate operation of printing. Another method has employed the use of a resinous primer layer which contains phosphoric acid with subsequent printing thereon. While these prior art methods have proved satisfactory, nevertheless the need for a simpler method (preferably one-step) will be readily apparent.

This invention involves the discovery that phosphoric acid in a critical amount may be incorporated directly in ink compositions to provide a strongly adherent coating when printed on aluminum surfaces without adversely affecting the color of the ink and without the need for employing a preliminary treatment of the aluminum surface. In accordance with the instant invention, ortho-phosphoric acid is added to an ink composition comprising as the necessary ingredients therein an organic solvent soluble resinous material, an alcohol or ester solvent, and an organic dyestuff.

Resinous materials which have been found to be particularly suitable for use in the ink compositions with phosphoric acid are zein and nitrocellulose. It will be observed that a resin should be employed which is substantially inert to the effect of the phosphoric acid in the ink composition. For this reason resins such as epoxy resins, which are readily esterifiable with phosphoric acid, should be avoided. Zein is preferred as the resin for the reason that it is particularly compatible with phosphoric acid and provides exceptionally good adhesion. Nitrocellulose is particularly suitable when it is desired to obtain a high gloss printed surface. Additional resins such as rosin, shellac, ethyl cellulose, the fatty acid polyamides, and other well known film bases for inks may be employed although they are not as desirable as nitrocellulose and zein. Owing to its tackiness, rosin is preferably employed in conjunction with another resin. Moreover, shellac has a tendency to be precipitated out of solution by the phosphoric acid unless suitable precautions are taken. Mixtures of the various resins may be used advantageously. The amount of resin will depend upon the viscosity of the ink which is desired, the latter depending primarily on the type of printing method to be employed, i.e., gravure, offset, letterpress or flexographic. In general about 15 to 55% by weight of the resin based on the weight of the total composition will be employed with the range of 20 to 35% being particularly preferred for gravure inks.

The solvent system employed to prepare the ink should include either an alcohol, which is preferably a monohydric aliphatic alcohol, or an ester of such an alcohol with acetic acid in order to dissolve the resin. Additionally, the solvent constitutes a suitable vehicle in which to dissolve the phosphoric acid prior to incorporation in the ink composition. Other organic solvents which may be employed in conjunction with the alcohol to provide a solvent system include Methyl Cellosolve (ethylene glycol monomethyl ether), Cellosolve (ethylene glycol monoethyl ether), acetone, methyl ethyl ketone, etc. Methanol and butyl acetate are the preferred solvents although ethanol, n-propanol, iso-propanol and butanol and ethyl acetate are similarly useful. In addition, a small amount of water such as up to 10% by weight may be tolerated in the system and is actually desirable, provided the amount is not sufficient to precipitate the resin from solution. Generally, the solvent will comprise about 35 to 80% by weight of the total weight of the ink composition with the range of 55 to 80% being used for gravure inks.

The ortho-phosphoric acid employed may be used conveniently in the form of the 85% commercially available material. This may be diluted with water or alcohol prior to inclusion in the ink composition. A particularly suitable means for adding the phosphoric acid is in a mixture with alcohol and rosin of, for example, the following composition:

10 cc. $H_3PO_4$ (glacial, 85% by weight)
100 cc. methanol
5 g. rosin

The rosin helps to disperse the phosphoric acid uniformly and tends to prevent gelation when the acid is added to the remaining ingredients of the ink composition. By utilizing such a mixture, commercially available inks of the proper resin, solvent, and dye content may be modified for use in accordance with this invention. The amount of phosphoric acid employed is critical and should be within the range of 1.2 to 4% by weight of $H_3PO_4$ based upon the weight of the final ink composition. Smaller amounts will not generally produce adequate adhesion while larger amounts are unnecessary and in fact may have an adverse effect upon the aluminum surface or the ink composition. Particularly preferred is the range of 2.5 to 3.6% $H_3PO_4$.

In general, any organic dye may be employed in the ink provided that it is not adversely affected when contacted with the phosphoric acid. By "organic dye" it is meant an organic compound which is capable of absorption in the visible region of the spectrum. Dyes which have been found to be particularly suitable for use in the ink compositions of this invention are the cationic dyes and especially those containing amine salt groups such as the amine hydrochlorides. Examples of such dyes are Rhodamine B, Victoria Blue B, Malachite Green, Methyl Violet and Auramine. The exact nature of the organic dye is not critical provided, however, that it is not sensitive to phosphoric acid. The coatings will be transparent when the dye is soluble in the solvent system. In general, the above dyes have been found to be particularly stable in the phosphoric acid containing inks even after periods of several weeks. Occasionally, when some degree of unstability is noted, it may be desirable to add the phosphoric acid to the ink composition immediately prior to use. This may be conveniently done by using the phosphoric acid, methanol, rosin mixture as above described. The amount of dye to be employed in the ink will depend simply upon the purity of the dye and the deepness of the shade which is desired.

Ordinarily the dye will constitute at least about 0.4% by weight based upon the weight of the ink composition for the lighter shades with considerably more being employed for the darker shades.

Other agents may be added to modify the properties of the ink according to its particular adaptation. Thus a wax may be added to reduce scuff but such is generally not necessary. Non-drying oils or drying oils may be included depending upon the type of printing operation.

The aluminum surface which may be printed according to the invention may comprise a variety of different types. Aluminum foil and aluminum laminated paper or plastics wherein the aluminum has a thickness of from 0.00025 to 0.006 inch are preferred, although it is to be understood that such foil or lamina may be of any desired thickness. Such foils and lamina may be prepared by the conventional lamination, vacuum deposition or electrolysis techniques. The aluminum surface should be reasonably free of oil and other foreign matter before printing.

While the use of phosphoric acid in gravure inks is particularly advantageous it is to be understood that inks may also be formulated for printing on aluminum by other means such as the offset, letterpress and flexographic processes.

Aluminum surfaces printed with the inks of this invention have extremely good adhesion. While the exact reason for this phenomenon is not completely understood, it is believed that some chemical reaction occurs between the phosphoric acid in the ink and the aluminum surface. The instant process employing the phosphoric acid in the ink itself avoids the extra operations which have heretofore been necessary in order to obtain adequate adhesion of the ink to the aluminum. Moreover, while it has heretofore been believed that the presence of an excessive amount of phosphoric acid on the aluminum surface would deleteriously affect the ink, nevertheless it has been found, surprisingly, that the incorporation of the critical amounts of phosphoric acid in the resinous ink itself will not adversely affect either the ink or the printed surface.

An additional unexpected feature of this invention resides in the fact that inks containing phosphoric acid have improved flow properties. Especially desirable is the fact that the phosphoric acid containing inks may be overprinted with other colors.

The following examples serve to illustrate the invention but it is to be understood that the invention is not limited to the embodiments therein. Unless otherwise specified all parts are by weight.

Example I

The following ingredients were combined in their respective proportions and mixed to form a deep blue base ink of a smooth consistency:

| | Grams |
|---|---|
| Zein | 80 |
| Rosin | 20 |
| Methanol | 150 |
| Methyl Cellosolve | 50 |
| Water | 20 |
| Phosphoric acid (glacial, 85% $H_3PO_4$ by weight) | 16.1 |
| Methyl Violet | 5.3 |
| Victoria Blue B (conc.) | 7.5 |

The base ink was diluted to form a rotogravure ink by the addition of 69 grams $CH_3OH$ to the above formula to an approximate viscosity of 30 seconds Zahn No. 2 cup (General Electric).

The resulting ink was printed directly on a highly reflectant aluminum surface by using a chromium plated etched copper rotogravure roll having 165 lines per inch. After drying, the ink was tested for adhesion by pressing a pressure-sensitive adhesive tape against the printed surface. When the tape was stripped there was no visible amount of ink removed from the foil. When phosphoric acid was omitted in the above formulation, a similarly printed ink was readily removed from the aluminum surface upon stripping with the tape. The aluminum surface printed with the phosphoric acid containing ink had no detectable difference in color from the foil printed with the acid free ink. Moreover, after standing for a period of two months the aluminum surface printed with the phosphoric acid containing ink displayed no noticeable change in color.

Examples II to IV

The ink formulation and printing in Example I was repeated except that in place the dye mixture therein was used the following dyes respectively.

| Dye: | Grams dye |
|---|---|
| II. Malachite Green | 13.5 |
| III. Rhodamine B | 13.5 |
| IV. Auramine | 3.4 |

In each case the adherance of the ink was far superior to the same ink made without the phosphoric acid.

It is apparent that many widely different embodiments of this invention can be made without departing from the spirit and scope thereof; and, therefore, it is not intended to be limited except as indicated in the appended claims.

I claim:

1. In the method of printing with inks directly upon an aluminum surface without the use of a preliminary treatment of the surface, the improvement which comprises using as the ink composition a mixture comprising an organic solvent soluble resin, ortho-phosphoric acid in the amount of 1.2 to 4.0% by weight based upon the weight of the ink composition, a solvent selected from the group consisting of the monohydric aliphatic alcohols and the acetic acid esters of the said alcohols, not in excess of 10% by weight of water based on the ink composition, and at least 0.4% by weight based on the ink composition of an organic dye compound which is capable of absorption in the visible region of the spectrum, the absorption of said organic dye being substantially unaffected by the ortho-phosphoric acid in the ink composition.

2. The method of claim 1 wherein the said resin is a resin selected from the group consisting of nitrocellulose and zein.

3. The method of claim 2 wherein the said composition contains additionally rosin.

4. The method of claim 1 wherein the said organic dye is a cationic dye containing amine salt groups.

5. The ink printed aluminum surface produced by the method of claim 1.

References Cited in the file of this patent

UNITED STATES PATENTS

| | | |
|---|---|---|
| 2,322,927 | Drewsen et al. | June 29, 1943 |
| 2,346,957 | Wvertz et al. | Apr. 18, 1944 |
| 2,437,908 | Chiappe et al. | Mar. 16, 1948 |
| 2,564,864 | Thompson | Aug. 21, 1951 |
| 2,567,963 | Petke | Sept. 18, 1951 |
| 2,567,964 | Petke | Sept. 18, 1951 |
| 2,567,965 | Petke | Sept. 18, 1951 |
| 2,771,373 | Chambers et al. | Nov. 20, 1956 |

UNITED STATES PATENT OFFICE
CERTIFICATE OF CORRECTION

Patent No. 3,014,822                                      December 26, 1961

Vincent A. Lauderman

It is hereby certified that error appears in the above numbered patent requiring correction and that the said Letters Patent should read as corrected below.

In the grant, lines 2 and 12, and in the heading to the printed specification, lines 3 and 4, for "The Champion Papers Inc.", each occurrence, read -- Champion Papers Inc. --.

Signed and sealed this 19th day of June 1962.

(SEAL)
Attest:

ERNEST W. SWIDER
Attesting Officer

DAVID L. LADD
Commissioner of Patents